April 1, 1924.  F. H. BEALL ET AL  1,488,730
PROCESS FOR THE MANUFACTURE OF NITROBENZOIC ACIDS
Filed March 17, 1922
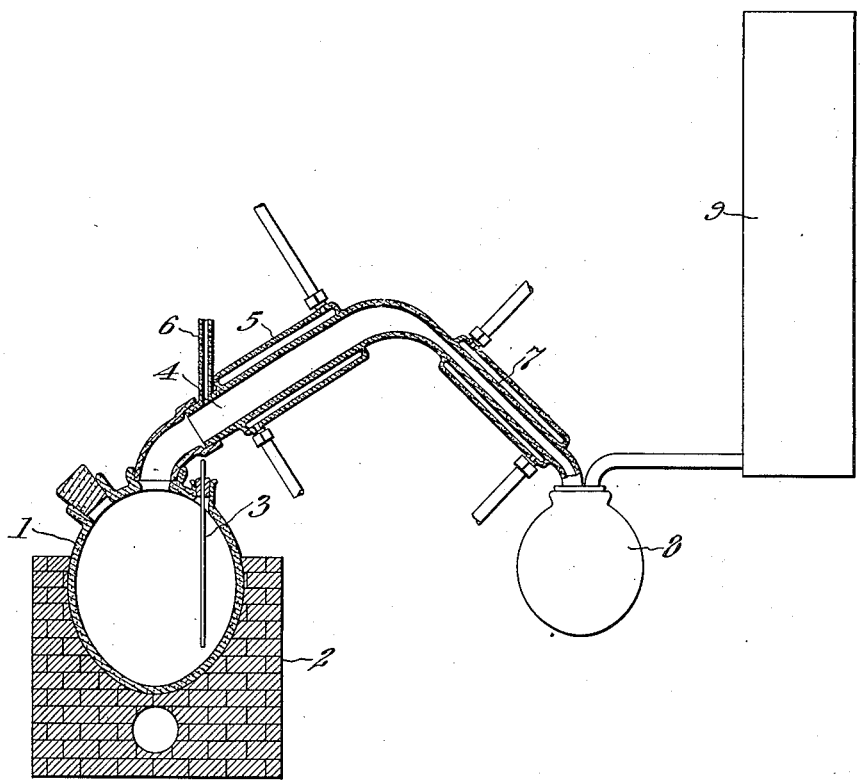
Inventors:
Frank H. Beall,
Donald B. Bradner,
by Byrnes, Townsend & Brickenstein,
Attorneys.

Patented Apr. 1, 1924.

1,488,730

UNITED STATES PATENT OFFICE.

FRANK H. BEALL, OF BALTIMORE, AND DONALD BYAL BRADNER, OF EDGEWOOD, MARYLAND.

PROCESS FOR THE MANUFACTURE OF NITROBENZOIC ACIDS.

Application filed March 17, 1922. Serial No. 544,588.

*To all whom it may concern:*

Be it known that we, (1) FRANK H. BEALL and (2) DONALD BYAL BRADNER, citizens of the United States, residing at (1) Baltimore, Maryland, and (2) Edgewood, county of Harford, State of Maryland, have invented certain new and useful Improvements in Processes for the Manufacture of Nitrobenzoic Acids, of which the following is a specification.

This invention is a method whereby organic bodies may be rapidly oxidized by means of nitric acid of lower concentration or at lower pressures than it has been practicable heretofore to employ in reactions of this kind. The invention is applicable to a wide variety of oxidation reactions, as will more clearly appear hereinafter; but it will be described by way of illustration and example as applied to the reaction whereby nitro-benzoic acids are prepared by the controlled oxidation of nitro-toluenes, and more particularly o-nitrotoluene.

Such reactions have been carried out heretofore in a variety of ways, among which may be mentioned the reference to heating under pressure of o-nitrotoluene with 20% nitric acid at high temperatures as mentioned in U. S. Patent 1,015,496 of 1912. In U. S. Patent 1,332,028 it has been proposed to oxidize o-nitrotoluene to o-nitrobenzoic acid by stratifying the o-nitrotoluene with nitric acid of 20-43% strength and heating under a reflux condenser: but the reaction rate under these conditions is so low as to render the process uncommercial.

In U. S. Patent 1,015,496, the process is described for nitrating nitrotoluene in the side chain to form nitrophenylnitromethane, in which process small amounts of nitrobenzoic acid and nitrobenzaldehydes are obtained as by-products, the temperature range being given as 110-120° C. In U. S. Patent 1,015,691 similar results are secured by using higher temperatures 130-140° C. and adding strong nitric acid 70-100% in the vapor phase.

According to the present invention, we are enabled to secure and maintain a rapid oxidation of o-nitrotoluene at substantially atmospheric pressure at 165° C., even when nitric acid as dilute as 20% is used. A yield of approximately 90% of substantially pure o-nitrobenzoic acid is obtained in this manner.

We accomplish this in the preferred embodiment of the invention by providing a liquid bath of sufficiently high boiling point in which nitric acid is somewhat soluble, heating the same at the predetermined optimum working temperature for the particular reaction, and supplying nitric acid, of limited concentration and in definitely controlled proportion, to the heated bath throughout the operation. We believe the mechanism of the reaction to be substantially as follows:—Nitric acid dissolves in the bath where most of it reacts with the oxidizable substance forming nitrous gases and water. The dilute nitric acid thus formed distills out of the bath, the process being continuous, fresh nitric acid replacing the dilute nitric acid as fast as it is removed. Most of the heat that is supplied to and results from the reaction is consumed in evaporating this dilute nitric acid, consequently the temperature may be controlled by supplying heat and nitric acid to the bath in correct quantity and ratio. Increase in the rate of supply of nitric acid, if additional heat is also added to maintain the temperature, will increase both the reaction rate and the strength of the dilute acid, which distills out of the bath. The nitric acid which is added at a given temperature should be of a limited concentration, meaning thereby an acid of a concentration less than that which will cause any considerable nitration under the conditions employed. The optimum conditions for any particular reaction can be readily determined by experiment. In the process for the oxidation of o-nitrotoluene, hereinafter described, we have been unable to detect the presence of any highly nitrated bodies, the product being substantially pure o-nitrobenzoic acid.

We control the temperature of the heated bath and maintain the best working conditions therein, by regulating the quantity of heat and the rate of supply of nitric acid thereto. Many methods of accomplishing this regulated supply are of course available; but we prefer to reflux to the bath a carefully controlled proportion of the acid vapors rising from it, preferably introducing air or oxygen at the same time in order to oxidize and thereby render available lower oxides of nitrogen. Additional nitric acid for replacing that consumed in the oxidation may be added at the same time, either as nitric acid or as nitrogen peroxide or nitrous gases.

One simple form of apparatus suitable for carrying out our invention is shown in the accompanying drawing wherein the figure is a central vertical section. In said figure, 1 indicates a retort of chemical stoneware or other acid-proof material, mounted in a furnace setting 2 and provided with a thermometer 3. In the particular form of apparatus illustrated the retort is surmounted by an inclined column 4 provided at 5 with a water jacket or equivalent temperature controlling means for regulating the proportion of the effluent vapors refluxed to the retort 1. 6 is an inlet through which nitric acid, nitrogen peroxide or nitrous gases may be supplied. 7 represents a condenser for that portion of the vapors which is permitted to pass the refluxing column; 8 a receiving vessel for the condensate; and 9 a scrubbing tower or equivalent device on the exit gas line. It will of course be understood that this illustration of apparatus is essentially schematic and that the particular arrangement shown may be widely varied, as for example, instead of heating the reaction vessel externally, the heat may be supplied to vaporize all or part of the nitric acid in a separate vessel, this heat being added to the reaction by introducing the nitric acid vapors thus obtained into the reaction bath.

In a typical example in accordance with the invention, an excellent yield of nitrobenzoic acid can be obtained in a few hours as follows:

A mixture of about equal parts of nitrobenzoic acid and nitrotoluene is introduced into the reaction vessel 1 and brought to a temperature of about 165° C. Nitric acid of about 50% strength is then slowly introduced at 6 until the bath comes to a uniform boil at the above temperature. The nitrous gases formed together with fumes of nitric acid and nitrotoluene, pass into the refluxing column 4 where most of the nitrotoluene condenses and a fractionation of the nitric acid takes place, the stronger nitric acid returning with the nitrotoluene to the reaction vessel, while the weaker acid, together with a small amount of nitrotoluene passes with the nitrous fumes to the condenser 7 and is recovered in the receiving vessel 8. The nitrous gases pass on to the recovery system 9, which may be of any approved type. Additional nitric acid for replacing that consumed in the oxidation is added at 6, either as nitric acid or as nitrogen peroxide or nitrous gases. It may be desirable to introduce air or oxygen into the column 4 in order to utilize the nitric acid more effectively. The total quantity of aqueous nitric acid supplied to the reaction vessel, whether by refluxing or by introduction from without, is carefully controlled throughout the operation to maintain the predetermined optimum conditions for the reaction. After the conversion of the nitrotoluene to nitrobenzoic acid is approximately 90% complete, the products of the reaction are drawn from the vessel 1 and the nitrobenzoic acid separated by known methods from the nitrotoluene and small amount of nitric acid. The nitrotoluene may be returned for further treatment.

The addition of nitrobenzoic acid at the beginning of the operation provides a bath of higher boiling point, thereby decreasing the quantity of nitrotoluene distilled, increasing the solubility of nitric acid in the liquid, and in general improving the conditions of the reaction. On account of the diminution in quantity of nitrotoluene as the reaction proceeds, it is not advisable to attempt complete conversion. We find that a satisfactory operating condition is obtained when the ratio of nitrobenzoic acid to nitrotoluene lies between $\frac{1}{3}$ to 1 and 9 to 1. However the process may be carried out starting with pure nitrotoluene and finishing with practically pure nitrobenzoic acid.

165° C. is a satisfactory working temperature for this specific reaction, although the process is operative over a relatively wide temperature range. At 120° C the reaction rate is low and by-products are formed. These conditions improve with increasing temperature, but above about 190° C. an unnecessarily large amount of nitrotoluene is distilled into the condenser; and the amount of destructive oxidation at these higher temperatures offsets many of the advantages which might be expected from the use of high temperatures. It will of course be understood that these specific temperatures and temperature ranges apply to the particular reaction under discussion; but optimum reacting conditions are readily determined experimentally for each specific case.

We claim:—

1. In the process of oxidizing organic compounds by treatment thereof with nitric acid the steps comprising heating a bath containing the substance to be oxidized to a reacting temperature above 120°C. and supplying heat and nitric acid of limited concentration to the bath in such quantity and ratio as to maintain such temperature.

2. Method according to claim 1 in which the nitric acid is supplied to the bath at substantially the rate at which it is dissolved therein.

3. In the process of oxidizing organic compounds by treatment thereof with nitric acid the steps comprising heating a bath containing the substance to be oxidized at a reacting temperature; condensing and returning to the bath a portion of the acid vapors arising therefrom; supplying nitric acid to the bath; and controlling the amount of condensate to maintain the bath at the desired operating temperature.

4. Method according to claim 3 in which an oxide of nitrogen is supplied from an external source to the acid vapors arising from the bath.

5. Method according to claim 3 in which nitric acid is supplied to the bath at substantially the rate at which it is dissolved therein.

6. Method of producing nitrobenzoic acid comprising heating a bath containing nitrotoluene to a reacting temperature above 120° C. and supplying heat and nitric acid of a limited concentration to the bath in such quantity and ratio to maintain such temperature.

7. Method of producing nitrobenzoic acid comprising heating a bath containing nitrotoluene at the reacting temperature above 120° C. and supplying nitric acid of limited concentration to the bath at substantially the rate at which it is dissolved therein.

8. Method of oxidizing nitrotoluene comprising heating a bath containing the same at 120-190° C., condensing and returning to the bath a portion of the acid vapors arising therefrom; supplying nitric acid to the bath; and controlling the amount of condensate to maintain the bath at the desired operating temperature.

9. Method of oxidizing nitrotoluene comprising heating a bath containing the same at a temperature of about 165° C. and supplying nitric acid of about 50 per cent strength to the bath.

10. Method as defined in claim 9 in which a portion of the vapors arising from the bath is condensed and returned to the bath with fresh nitric acid.

11. Method of producing nitrobenzoic acid comprising heating a bath containing nitrotoluene at a reacting temperature above 120° C. while supplying nitric acid of from 20 per cent to 90 per cent strength to said bath until the ratio of nitrobenzoic acid to nitrotoluene in said bath is between $\frac{1}{3}$ to 1 and 9 to 1, separating nitrobenzoic acid from unoxidized nitrotoluene and secondary reaction products, mixing the separated nitrotoluene and secondary reaction products with fresh nitrotoluene and subjecting the mixture to the action of nitric acid in a repetition of the process.

In testimony whereof, we affix our signatures.

FRANK H. BEALL.
DONALD BYAL BRADNER.